J. P. HANSEN.
PHOTOGRAPHIC CAMERA.
APPLICATION FILED DEC. 10, 1918.
1,305,097.
Patented May 27, 1919.
2 SHEETS—SHEET 1.
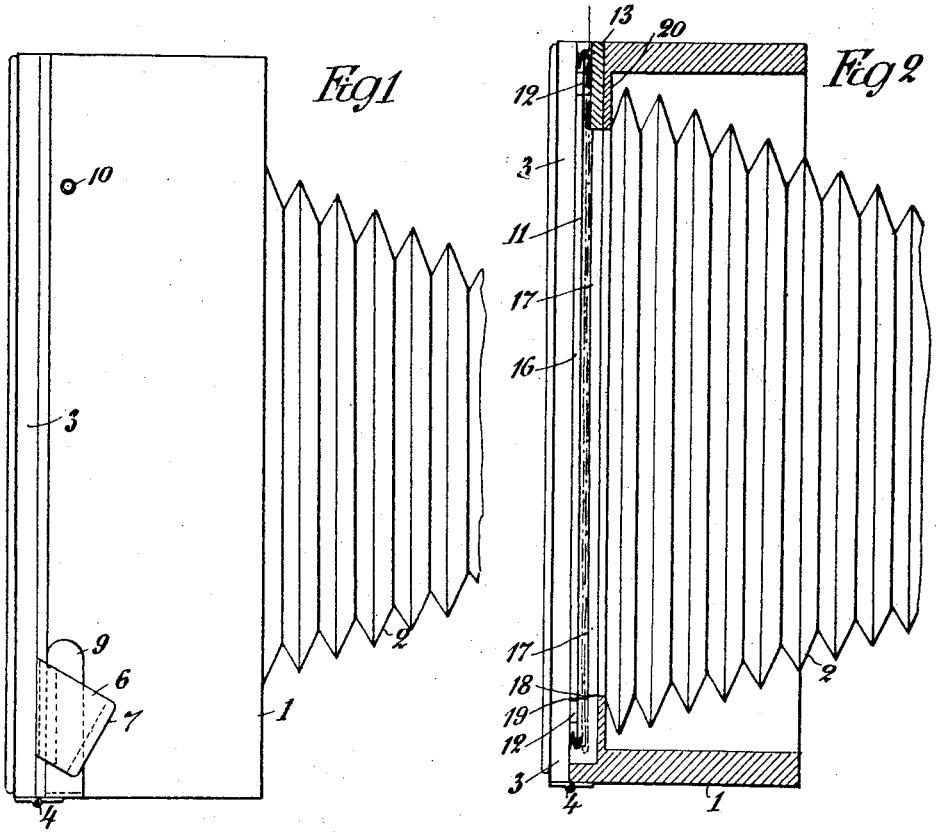
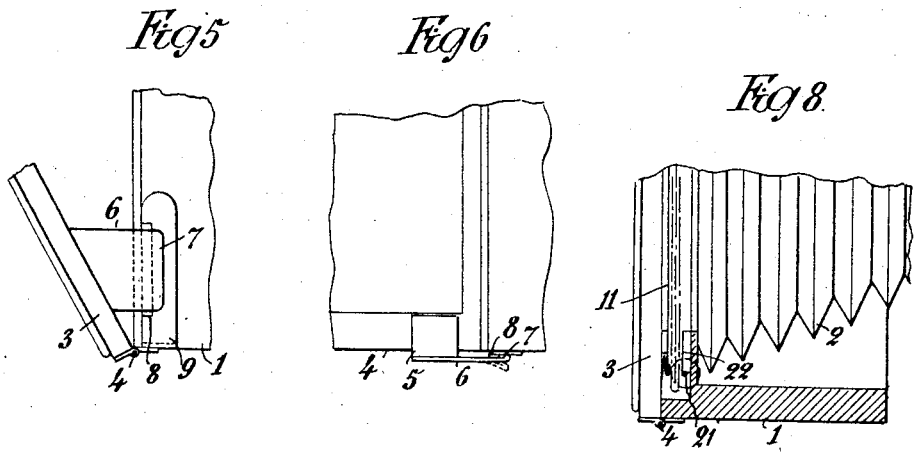
Inventor
Jens Peter Hansen
By
Attorneys

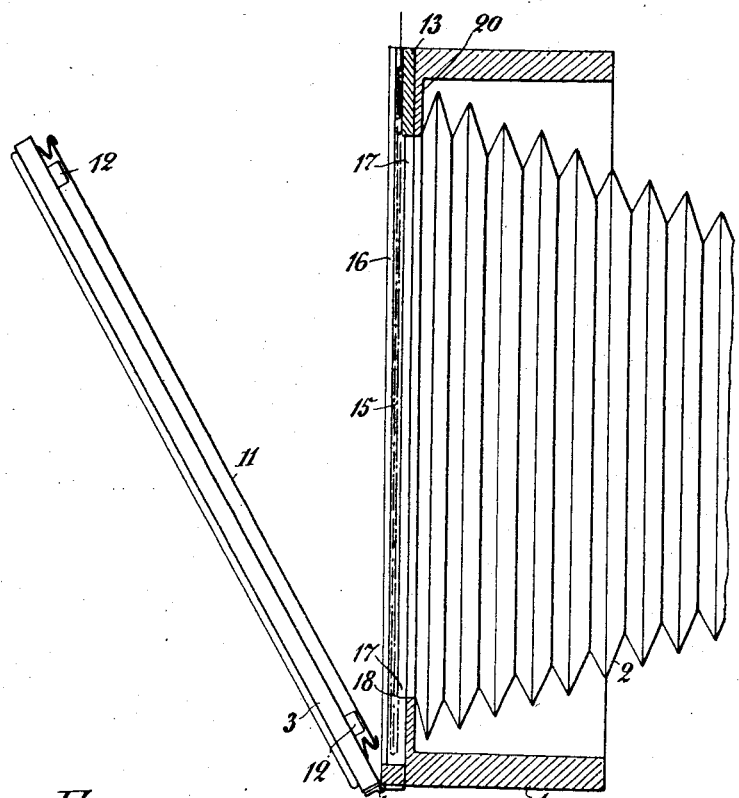
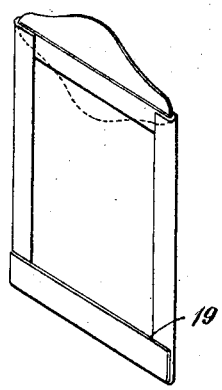
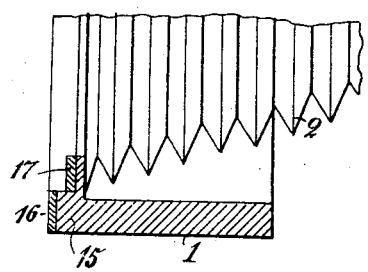

UNITED STATES PATENT OFFICE.

JENS PETER HANSEN, OF COPENHAGEN, DENMARK.

PHOTOGRAPHIC CAMERA.

1,305,097. Specification of Letters Patent. Patented May 27, 1919.

Application filed December 10, 1918. Serial No. 266,172.

*To all whom it may concern:*

Be it known that I, JENS PETER HANSEN, a subject of the King of Denmark, and residing at Copenhagen, 10 Jacobys Alle, Denmark, have invented certain new and useful Improvements in Photographic Cameras, of which the following is a specification.

My invention relates to improvements in photographic cameras, and has for its object to provide a camera adapted to be used with film packings and also plate packings which consist of an envelop with cover plate and provided with a projecting edge, which envelop may, when closed, be introduced in the camera, and be kept fast there during the displacement of the cover plate, to be taken out again when the exposure has been finished.

The device in question may be applied to any photographic camera with slight alterations. The invention is in a couple of forms of execution shown on the drawing, where:—

Figure 1 shows a side view of the back part of a camera,

Fig. 2 is a longitudinal section through the camera with the film envelop inserted (dotted), Fig. 3 is a corresponding view, but with the ground glass frame in swung out position, Fig. 4 is a horizontal section through one of the back corners of the camera, Fig. 5 shows a side view of the stop for the ground glass frame, Fig. 6 is a top view of the same, Fig. 7 shows a film envelop with the overlapping part of the cover-plate clapped out for use in a camera in conformity with the construction herein dealt with, and Fig. 8 is an altered form of execution for the invention.

On the drawing 1 is the back part of the camera casing 1, bellows 2 and 3 and ground glass frame. The frame 3 hinged to the camera carries along the lowest rear edge of the camera the casing. The back part of the camera casing is shaped as shown on Figs. 3 and 4. The frame 3 is hinged to the casing 1 by a hinge 4, which must be light-tight. On both sides of the back part of the camera casing, are two parallel projecting strips 15, provided with light-tight packing 16, against which strips, the ground glass frame may fit light-tight in the closed position. Within the strips 15 are a couple of lower strips 17, which do not extend down to the bottom, but have their lower ends cut off, so that projecting edges or hooks 18 (Fig. 3) are formed which edges or hooks coöperate with corresponding edge 19 on the film envelop. At the top of the casing is a broad, opaque packing 13 on the edge 20 of the casing. The strips 17 and edge 20 and the packing 13 form what I term a back frame, which coöperates with the ground glass 11. Springs 12 are applied in such a manner to the ground glass frame 3, that the ground glass normally presses in against the back frame 17—13 with a constantly springy pressure.

Along the bottom of the back frame of the camera casing beneath the edges or hooks 18 is a space, adapted for receiving the projecting edge of the film envelop to make sure that no pressure is exerted upon the said projecting edge of the film envelop. This is very important, as even a slight pressure on the said protruding edge would prevent the cover plate of the envelop from being pulled properly in.

The ground glass frame 3 as before mentioned, swings upon the opaque hinge 4, and may be held in the swung-out position by a couple of ferrules 5 having wings 6 provided with inwardly directed hooks 7 which coöperate with corresponding outwardly directed hooks 8 on the ferrule 9 on the camera casing 1. When the ground glass frame has swung out so far, that the hooks 7 engage the hooks 8 a further movement is impossible, except when the two wings 6 are moved by the hand so that the hooks 7 are disengaged from the hooks 8, as indicated on Fig. 6.

The device acts in the following manner:—When a film envelop is to be inserted it is with the back plate turned facing the ground glass 1, forced down between the closed ground glass frame and the light-tight packing 13, and is moved along the strips 17, until the projecting edge 19 on the front side of the film envelop comes down under the hooks 18 on the strips 17. Before the film envelop has been pushed completely down, the sealing must be broken and the hasp or tongue on the cover plate of the envelop moved out, so that it may be possible to get hold of it in order to draw up the cover plate. The springing ground glass will now keep the film envelop pressed firmly against the strips 17 and 13 so that the light is excluded, the film held firmly, and the projecting edge 19, on the film envelop is constantly kept pressed in under the edges of hooks 18. Then the cover plate is drawn out, until a bent edge, with which it is provided below has come in catching engagement with another bent edge on the envelop.

After the exposure, the cover plate is pulled back, and the ground glass frame 3 is now swung outwardly, the spring hooks which hold the frame closed being released by pressing the press buttons 10.

When the ground glass frame has been swung outwardly sufficiently to allow the edge 19 of the envelop to pass the hooks 18, the film envelop may be taken out and may be again sealed. By hinging of the ground glass frame it only enables the projecting edge 19 of the film envelop to be disengaged from the hooks 18 when the frame is swung outwardly, but also enables the film envelop to be introduced into the camera, in an easy and speedy manner. It also enables the film envelop with the seal broken to be readily inserted in front of the open ground glass frame, which is thereafter closed, after which the cover plate is drawn up. The upper edge of the holding ribbon on the film envelop or the side bendings on it may replace the lower edge 19, in which case the hooks 18 must be applied higher up on the back edge of the camera casing.

Instead of making the ground glass frame hinged, so that the film envelop may be taken out, a shaft may be applied along the front side of the film envelop and provided with a couple of fingers, wings or the like, which by the turning of the shaft press back the projecting edges 19 of the envelop. The same advantage is thereby attained, as when the ground glass frame may for example be applied firmly or movably in grooves in the camera, as also the ground glass itself may be applied loosely, movably in front of the springs.

This altered form of execution is shown on Fig. 8. In the camera casing above the lower edge of the ground glass frame, is mounted a shaft 21 with a wing 22 or a couple of eccentric disks, which, when the shaft is turned, will press on the film envelop and thereby force it back together with the springy ground glass sufficiently so that the projecting edge 19 of the envelop will be disengaged from the hooks 18, after which the envelop may be drawn up.

The construction may of course also, without the principle of the invention being deviated from, be formed in other ways in order to hold the projecting edges 19 of the film envelop, and the releasing later on, of the same. The releasing may take place by any arrangement, which presses back the ground glass or its lower part or neutralizes the pressure from this, for example by taking out the ground glass or the ground glass frame, with attached springs. Finally it may be arranged in such a manner that the hooks 18, or the said strip, are applied in a springing manner.

I claim:—

1. In a photographic camera adapted for use with film envelops, a casing having a rearwardly projecting lower edge and provided on its rear part with vertical strips, the lower ends of which terminate short of the bottom of the casing, so that they form stops for the projecting edge of the film envelop.

2. In a photographic camera adapted for use with film envelops, a casing provided with a back frame whose vertical members terminate short of the bottom of the casing, whereby the lower ends of the said members will form stops for the projecting edge of the film envelop and a space will be formed in the casing below said ends for the reception of the said projecting edge of the film envelop.

3. In a photographic camera adapted for use with film envelops, a casing, a back frame at the rear of the casing and having its vertical members terminating short of the bottom of the casing, and a frame hinged to the rear lower portion of the casing and carrying a yieldingly supported ground glass, whereby the projecting edge of the film envelop will be pushed under the lower edges of the said frame members when the ground glass frame is closed.

4. In a photographic camera adapted for use with film envelops, a casing, a frame on the casing and carrying a yieldingly supported ground glass, and a shaft mounted in the lower portion of the casing and provided with projecting members for engaging the edge of the film envelop, as and for the purpose set forth.

5. In a photographic camera adapted for use with film envelops, a casing, a back frame, the vertical members of which terminate short of the bottom of the casing to form engaging means for the projecting edge of the film envelop, and means whereby the engaging means may be disengaged from the projecting edge of the film envelop.

In testimony whereof I affix my signature in presence of two witnesses.

JENS PETER HANSEN.

Witnesses:
G. C. SLECKHALM,
E. THERKELIN.